United States Patent [19]

Nemcek, Sr. et al.

[11] 4,423,968
[45] Jan. 3, 1984

[54] ACCURATE HAND-HELD DIGITAL READOUT THERMOMETER

[75] Inventors: Donald S. Nemcek, Sr., Roselle; John J. Selman, III, Vernon Hills, both of Ill.

[73] Assignee: Cole-Parmer Instrument Company, Chicago, Ill.

[21] Appl. No.: 266,639

[22] Filed: May 26, 1981

[51] Int. Cl.³ .............................................. G01K 7/14
[52] U.S. Cl. ................................... 374/170; 374/173; 374/181; 374/182; 374/121
[58] Field of Search ................... 73/361, 362.4, 355 R, 73/359 R; 324/105; 136/222; 374/170, 173, 181, 182, 121

[56] References Cited

U.S. PATENT DOCUMENTS 3,067,610 12/1962 Bockemuehl et al. ............. 73/355 R
3,586,168 6/1971 Osheff ........................... 73/355 R X
3,766,781 10/1973 Roberts ............................ 73/355 R
3,777,568 12/1973 Risgin et al. .................. 73/355 EM
3,916,691 11/1975 Hollander et al. ..................... 73/361
4,150,433 4/1979 Kaniel ........................... 73/362.4 X

FOREIGN PATENT DOCUMENTS

WO81/00764 3/1981 PCT Int'l Appl. ................. 250/349

OTHER PUBLICATIONS

Daniel Sheingold, Ed., *Non-Linear Circuits Handbook,* (Analog Devices, Norwood, Mass. 1974), pp. 94–97.
Kerel E. Kuijk, A Precision Reference Voltage Source, IEEE J. of Solid State Circuits (Jun. 1973), p. 222.
Schematic Diagram, Newport Model 268 Digital Pyrometer.
Advertising and Circuit Diagram, Atkins "Digi-Sense."

*Primary Examiner*—E. R. Kazenske
*Assistant Examiner*—Tom Noland
*Attorney, Agent, or Firm*—Fitch, Even, Tabin & Flannery

[57] ABSTRACT

A hand-held digital readout thermometer measures temperatures over the range −50° C. to +1100° C. with a maximum error less than 3° C. in that range. The thermometer includes a thermocouple, a temperature stable and temperature independent power supply, a temperature stable differential first amplifier, a second amplifier that compensates for the nonlinear response of thermocouple voltage to temperature, and an analog/-digital converter controlling a digital display indicating temperature according to a preselected scale. A particular feature of the invention is a latching comparator capable of activating a low battery indicator when the supply voltage drops below a preselected value.

4 Claims, 5 Drawing Figures

ACCURATE HAND-HELD DIGITAL READOUT THERMOMETER

The present invention relates generally to thermometry. More particularly, it relates to hand-held thermometers capable of making accurate temperature measurements over a temperature range of several hundred degrees Celsius.

BACKGROUND OF THE INVENTION

It is generally known that the voltage output of a Seebeck effect thermocouple is a nonlinear function of the difference between a measured temperature and a reference temperature. Even when the reference temperature is held constant, the relationship between the output voltage and the measured temperature will deviate from linearity. Extreme precision laboratory measurements using thermocouples therefore required careful control of the reference temperature and the use of tables to relate the output voltage to the temperature being measured. Such a laboratory technique is generally inconvenient for everyday commercial use.

Commercially available hand-held thermometers supply a voltage to the thermocouple reference junction to compensate for variations in the ambient reference temperature. Electronic circuitry may then be provided to compensate for the nonlinear response function of the thermocouple and to amplify the thermocouple voltage in order to provide a digital or analog readout in temperature units, e.g., degrees Celsius or Fahrenheit.

One approach to compensation for the nonlinearity of the thermocouple response curve involves the use of microprocessor technology. Units utilizing microprocessors, however, are relatively expensive.

Another approach involves the use of circuitry which changes the amplifier gain as the input voltage increases so as to provide a piecewise linear approximation to the amplifier response curve. Prior applications of the piecewise linear method have required that the gain only decrease as the input voltage is increased. Such an application is shown in Daniel H. Sheingold, Ed., NON-LINEAR CIRCUITS HANDBOOK (Analog Devices, Norwood, Mass. 1974) pp. 94–97. Thermometers presently made using such techniques, however, show substantial variation in accuracy from thermometer to thermometer. For example, a sample of 26 Atkins thermometers was tested by determining the measurement error of each thermometer over a range of temperatures from $-50°$ to $+2000°$ F. The measurement errors when measuring a temperature of 1100° F. ranged from $-9°$ F. to $+11°$ F., although the accuracy is specified to be $\pm 0.5\%$ of the reading $\pm 1°$.

It is, therefore, an object of this invention to provide an improved hand-held digital readout thermometer capable of reading temperatures sensed by a thermocouple over ranges of several hundred degrees. Another object of this invention is to provide a hand-held digital readout thermometer having lower temperature drift variation than has been attainable heretofore.

Another object of this invention is to provide a hand-held digital thermometer having less variation in accuracy from unit to unit than has been achieved heretofore.

Another object of this invention is to provide at substantially lower cost than heretofore a hand-held digital readout thermometer capable of high accuracy.

Further objects and advantages of the present invention will become apparent to those skilled in the art as the description proceeds.

SUMMARY OF THE INVENTION

In accordance with the present invention, a hand-held digital readout thermometer is provided that is capable of reading temperatures with high accuracies over a temperature range of several hundred degrees Celsius. A specific construction of an embodiment of the invention is capable of measuring temperatures between minus 50 degrees C. and plus 1,100 degrees C. with a maximum error in that range of less than 3 degrees C. The response variation between units is of the same magnitude.

The specific construction makes use of the substantially identical temperature coefficients of pairs of diodes to achieve first order cancellation of temperature effects and thereby a substantially temperature independent difference between a reference voltage and the negative terminal of a battery supplying power for the thermometer circuitry. The stable reference voltage difference is used to provide a compensating voltage, varying with ambient temperature, to a thermocouple reference junction so that the thermocouple responds as though its reference junction were held at a substantially fixed reference temperature. A stable "ground" voltage is also derived from the stable reference voltage.

The main voltage gain for the thermocouple output voltage occurs, in the specific construction, in a preamplifier in which differential amplification by op-amps on a common substrate is used to provide a gain that is also substantially independent of temperature. Further amplification at the input to a temperature compensation circuit followed by attenuation minimizes inaccuracies in the grain compensation circuit. The technique of amplification followed by attenuation thereby permits economical construction of the gain compensation circuit because high precision components need not be used. Additional economy results from the use of components on common substrates, such as in the preamplifier section, to permit the use of lower cost components having somewhat less precision than would otherwise be required.

The output from the attenuator is summed with voltages from the gain compensation circuit and then converted into digital form to drive a digital display which may read either in Fahrenheit or Celsius units.

The gain compensation circuit utilizes a piecewise linear approximation to the thermocouple response curve, but unlike prior circuits it is capable of fitting curves that are both concave and convex upward. The circuit thereby is capable of providing a higher precision fit to the thermocouple response curve than has been achieved previously.

A further novel feature of the specific construction is the use of a Schmitt trigger circuit in combination with the stable reference voltage difference to detect a low battery condition and indicate the same on a display.

A more detailed description of a specific construction of an embodiment of the invention will be provided.

BRIEF DESCRIPTION OF THE DRAWINGS

The present invention may be more readily described by reference to the accompanying drawings, in which.

DETAILED DESCRIPTION

Figure 1:
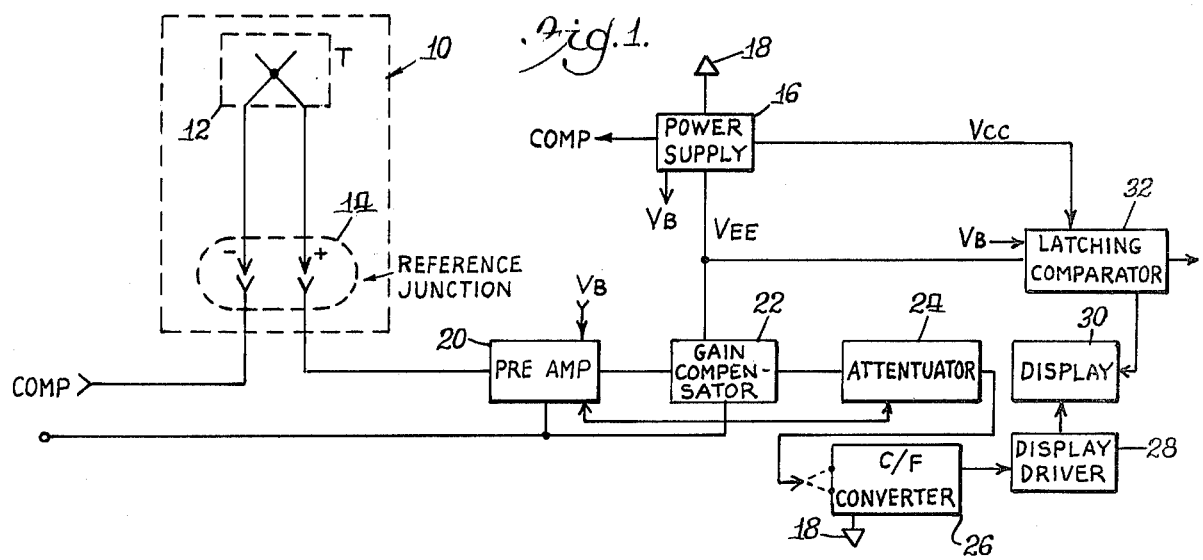
FIG. 1 is a block diagram of a hand-held digital readout thermometer in accordance with the present invention.

As illustrated in FIG. 1, the digital electronic thermometer of the present invention includes a thermocouple 10 for responding to the temperature of its environment by producing an electrical signal systematically related thereto. The thermocouple 10 has a measuring junction 12 and a reference junction 14. The thermocouple may be an Omega type "K" thermocouple with characteristics as described in the 1980 *Omega Temperature Measurement Handbook* available from Omega Engineering, Inc., Stamford, Conn. The measuring junction 12 will ordinarily be at a temperature T to be measured, as indicated in the drawing. The reference junction 14 will be at some different temperature $T_{ref}$. The thermocouple 10 is calibrated for $T_{ref}$ at 0° C. Compensation for the difference between actual $T_{ref}$ and $T_{ref}$ at 0° C. is provided by a compensating voltage $V_{comp}$.

A battery 15 supplies a positive voltage $V_{CC}$ at its positive terminal and a negative voltage $V_{EE}$ at its negative terminal. A reference voltage $V_B$ is generated by a temperature compensated power supply 16 which also generates, from the battery 15, a stable ground reference voltage 18 relative to the negative voltage $V_{EE}$. The positive and negative terminals of the thermocouple 10 at the reference junction 14 will develop a voltage differential dependent upon the temperature $T_{ref}$ of the reference junction 14 and the temperature T to be measured, as will be understood by persons skilled in the art of designing thermocouples. The compensating voltage $V_{comp}$ is designed to compensate for the voltage generated by the reference junction 14 at temperature $T_{ref}$ relative to the voltage it would generate at a standard reference temperature, which is usually 0° C. The remaining voltage difference between the positive and negative terminals at the reference junction 14 will thereby be systematically related to and accurately indicative of the temperature T to be measured.

The relationship between the temperature T at the measurement junction 12 of the thermocouple 10 and the output voltage at the reference junction 14 is given in tables provided by the National Bureau of Standards or conveniently available from the thermocouple manufacturer. The specific embodiment described herein was designed for use in the range of approximately −50° Celsius to +1100° Celsius. The temperature-voltage response curve in that range may be approximated by a series of straight lines providing a piecewise linear approximation to the response curve.

The piecewise linear approximation approximates at any temperature the true voltage of the response curve by an approximate voltage which is in error by an amount $\Delta V$. The error $\Delta V$ may be reduced to any preselected arbitrarily small value by utilizing a sufficient number of straight lines for approximating the response curve.

It is a feature of the teachings of the present invention to utilize the approximation to the response curve by a sequence of straight lines, implemented by a gain compensator circuit, to provide for a voltage response which is linearly related to the temperature to be measured, within preselected tolerances.

The output from the terminals at the reference junction 14 is input into a first amplification means comprising a temperature compensated preamplifier 20 as shown in FIG. 1. The preamplifier illustrated provides an overall gain of approximately 75. The output of the temperature compensated preamplifier 20 is input into a second amplification means comprising a gain compensator 22 and an attenuator 24. The attenuator 24 reduces the voltage by a factor of 3 and sums the reduced voltage with the output of the gain compensator 22. The output of the attenuator 24 is fed into a scale selection means comprising a Celsius/Fahrenheit converter 26 which is calibrated to give an output in either degrees Celsius or degrees Fahrenheit as manually selected. The analog output of the converter 26 is then fed to an analog/digital display driver 28 which may be used to drive an appropriately chosen digital display 30.

The battery voltage is sensed by a latching comparator 32 used as a low battery detector which may provide an appropriate signal on the display 30 in the event of a low battery condition.

The circuit components of the preferred circuit may have values and be connected as shown in the drawings. The various components and their functions will now be described in greater detail.

Power Supply 16

Figure 2:
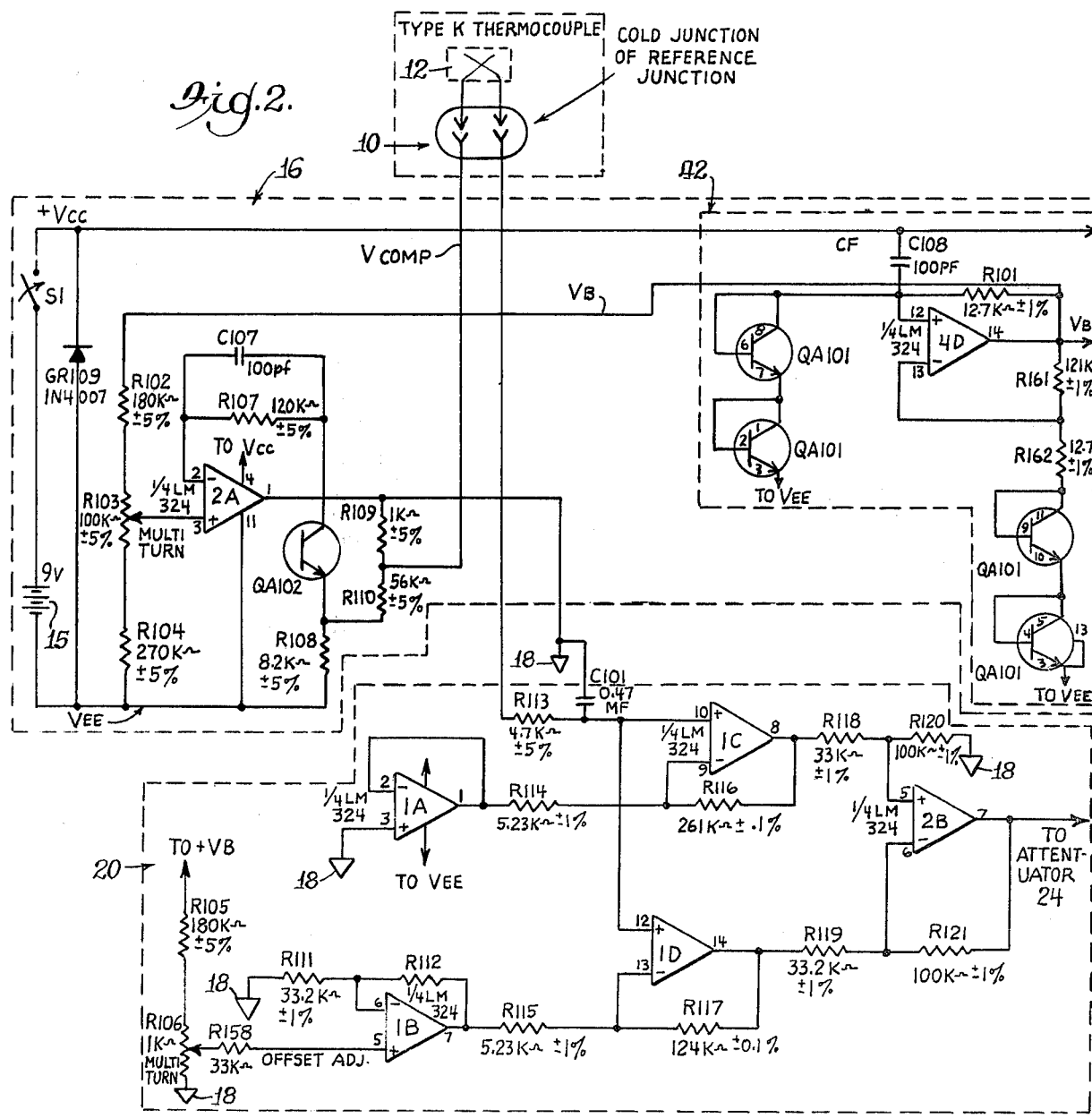
FIG. 2 is a schematic illustration of the thermocouple, the preamplifier, and the power supply of the thermometer shown in FIG. 1.

The specific embodiment of the power supply 16 described herein may be conveniently designed for use with a 9-volt battery 15 connected to the remainder of the power supply circuit 16 through a switch S1, as depicted in FIG. 2. A rectifier GR109 is connected across the battery 15 and switch S1 so as to be reverse-biased. The rectifier GR109 will thereby protected the circuit in the event that leads are crossed or the battery 15 is installed backwards.

A $V_B$ circuit 42 comprised of an op-amp 4D and associated components provides a voltage $V_B$ which is positive and stable with respect to the negative terminal of the battery 15 at voltage $V_{EE}$ thereby providing a stable reference voltage difference. The voltage difference is substantially temperature stable to about 10 ppm/°C.

An op-amp 4D is powered by the 9-volt battery, as are all op-amps in the circuit. The noninverting input terminal 4D-12 of the op-amp 4D is connected to the negative terminal of the battery 15 through a pair of diode connected transistors QA101-6, 7, 8 and QA101-1, 2, 3 which are in series and forward-biased. The inverting input terminal 4D-13 of the op-amp 4D is connected to the negative terminal of the battery through a resistance R162 and a pair of diode connected transistors QA101-9, 10, 11 and QA101-3, 4, 5, 13 which are in series and forward-biased. The output $V_B$ from output terminal 4D-14 is fed back to the noninverting terminal 4D-12 through a resistor R101 and to the inverting terminal through a resistor R161. The resistances of resistors R162 and R101 are chosen so that the input currents to the op-amp 4D are negligibly small relative to the currents through the transistors. The resistance values are essentially arbitrary and are conveniently chosen to be equal to balance the input currents to the op-amp inputs thereby making the output less sensitive to thermal drift. The ratio of the resistance of the resistor R161 to that of the resistor R162 is determined by the voltage $V_B$ of the output at the terminal 4D-14. In the specific construction the ratio is chosen to be approximately 10, corresponding to an output voltage $V_B$ of approximately +2.4 volts with respect to the voltage of the negative terminal of the battery 15, as will be discussed.

The $V_B$ circuit is a band-gap reference voltage source of a short commercially available. The principles of its operation may be understood by making the conventional assumption that op-amp 4D has infinite input impedance and amplification. The voltage difference, $V_B - V_{EE}$ is then given by the equation $$V_B - V_{EE} = V_1 + (R161/R162)(V_1 - V_2) \quad (1)$$

where $V_1$ is the voltage drop from QA101-8 to QA101-3 and $V_2$ is the corresponding voltage drop from QA101-11 to QA101-3. The voltage $V_1$ may be written, to a first approximation, as a sum of a temperature independent term, the gap voltage of silicon at 0° K., and a negative current dependent factor times the absolute temperature. Thus, by controlling the currents in each of the two pairs of diodes, the difference $V_1 - V_2$ may be made positive and proportional to temperature. Then R161 and R162 may be chosen so that the temperature dependence of the first term on the right side of Eq. (1) substantially cancels the second term in the approximation where the temperature dependences are linear. That is, cancellation is achieved to first order in the temperature. The voltage difference $V_B - V_{EE}$ will then be approximately equal to the band gap voltage of a pair of silicon transistors at 0° C., that is, 2.4 v.

In actual practice the four diode connected transistors QA101-1, 2, 3, QA101-3, 4, 5, 13, QA101-6, 7, 8, and QA101-9, 10, 11 are comprised of a single chip containing four n-p-n transistors, each collector-base connected. The four transistors may be integrated on a single substrate in order to cancel first order thermal drift.

A capacitor C108 is provided to apply a small voltage kick to the op-amp 4D at initial turn on, thereby preventing the output from settling into a stable voltage at the potential of the negative terminal of the battery 15. Three resistances R102, R103, and R104 connected in series between the terminal 4D-14 and the negative terminal of the battery 15 comprise a voltage divider with substantially negligible current drain from which the reference ground potential 18 is established. One end of the divider is at the potential $V_B$ and the other end at the potential $V_{EE}$ of the negative battery terminal.

The ground potential 18 is conveniently set to be approximately 1½ volts above the potential $V_{EE}$ of the negative terminal of the battery 15. The choice of 1½ volts and the specific construction utilized are made for ease of reading of digital voltmeters which often read to 1 mv. precision on a two-volt scale. The 1½ volts is picked off the voltage divider and fed to the noninverting terminal 2A-3 of an op-amp 2A. The op-amp 2A acts as a buffer to isolate the voltage source from the circuit and thereby provide the stable reference voltage 18. Stable feedback is provided by a resistor R107 from the output terminal 2A-1 to the inverting terminal 2A-2.

The resistor R107 is by-passed by a capacitor C107 which serves the purpose of providing a-c stability.

A diode connected transistor QA102 combined with resistors R109, R110, and R108 provide a temperature compensating voltage $V_{comp}$ for the reference junction 14 of the thermocouple 10. Resistors R109, R110, and R108 are series connected in that order between the stable ground 18 and the negative terminal $V_{EE}$ of the battery 15. The diode QA102 shunts the resistors R109 and R110 and is forward biased as shown in FIG. 2. The compensating voltage $V_{comp}$ is taken from between resistors R109 and R110.

The diode connected transistor QA102 may conveniently be chosen to be a Motorola MTS105 silicon temperature sensor. The ratio of the resistances of the resistors R109 and R110 may then be chosen so that the compensating voltage $V_{comp}$ has a temperature coefficient equal and opposite to the temperature coefficient of the thermocouple reference junction 14. The resistor R108 may provide proper bias for the transistor QA102 in accordance with the manufacturer's specifications. In a specific construction using the Motorola MTS105 temperature sensitive transistor, the described arrangement provides a temperature coefficient of about −41 mv/°C. at 25° C. ambient temperature.

Preamplifier 20

The preamplifier 20 comprises op-amps 1A, 1B, 1C and 1D, which should be in a single package, and an op-amp 2B. Inclusion of the four op-amps, 1A, 1B, 1C and 1D on the same chip provides for thermal drift compensation without necessitating the use of an expensive instrumentationquality amplifier. The op-amps 1C and 1D, together with the op-amp 2B, comprise a differential amplifier. In the circuit illustrated, the op-amp 1D has a gain of about 24.7. The op-amp 1C is in an amplifier circuit that provides a gain of approximately 51 and has 0 offset voltage at its terminal 1C-9. The op-amp 1B provides an adjustable offset voltage to the inverting terminal of op-amp 1D which may be used to calibrate the output of the op-amp 2B at a particular temperature. A specific construction of the embodiment sets the output at the terminal 2B-7 to be 0.5 v. at 0° C.

Persons skilled in the art of electronic circuit design will understand that temperature variations will cause voltage outputs from the op-amps 1A, 1B, 1C and 1D. However, with these op-amps all on a single chip, all four will be at substantially the same temperature, that is, at the temperature of the common substrate. As a result, the thermally generated voltages will be substantially the same in each op-amp. The op-amps are connected, and their gains arranged, so that the voltage outputs resulting from the thermal drift are substantially equal at the two differential outputs. As a result, when the differential outputs are used to drive the op-amp 2B, which has much less amplification than the op-amps 1C and 1D, the voltages induced by thermal drift will substantially cancel each other and thereby be ineffective in changing the output of the amplifier 2B.

The use of a differential configuration on a common substrate for the preamplifier stage makes it possible to use relatively inexpensive op-amps and still achieve substantial thermal stability. A specific construction of an embodiment incorporating the teachings of the invention could use a commercially available Texas Instruments LM324 quad op-amp.

The cancellation is effected by connecting the preamplifier circuit as shown in the drawings. The voltage from the reference junction 14 of the thermocouple 10 is fed through a resistor R113 to the noninverting terminals 1C-10 and 1D-12 of the amplifiers 1C and 1D. A capacitor C101 is connected between these terminals and the reference ground 18. The inverting terminal 1C-9 of the op-amp 1C is connected to the output terminal 1A-1 of the op-amp 1A through a resistor R114 and is also connected to the output terminal 1C-8 of the op-amp 1C through feedback resistor R116. The inverting terminal 1D-13 of the op-amp 1D is similarly connected to the output terminal 1B-7 of the op-amp 1B through a resistor R115 and also connected to the output terminal 1D-14 of the op-amp 1D through a resistor R117. The output terminal 1A-1 of the op-amp 1A is fed back directly to its inverting terminal 1A-2 and the noninverting terminal 1A-3 is connected to reference ground 18 so that the output of the op-amp 1A provides a stable ground voltage. The output terminal 1B-7 of the op-amp 1B is connected to its inverting terminal 1B-6 through a resistor R112 and the inverting terminal 1B-6 is connected to reference ground 18 through a resistor R111. The noninverting terminal taps a voltage divider R105-R106 through a resistor R158 and thereby picks off a voltage between $V_B$ and reference ground 18.

The effect of the thermal drift of the chip will be to generate the same voltage at the outputs 1C-8 and 1D-14 of the op-amps 1C and 1D if the thermally generated voltages on each side of the differential amplifier are amplified equally. The gains of the op-amps must consequently satisfy the relation:

$$G_{1C}(1+G_{1A}) = G_{1D}(1+G_{1B}) \qquad (2)$$

where $G_i$ is the gain of op-amp i.

The op-amp 1A has unity gain. Eq. (2) is therefore satisfied if the op-amp 1B provides a gain satisfying the equation $$G_{1B} = (2G_{1C}/G_{1D}) - 1 \qquad (3)$$

The resistors R111, R112, R114, R115, R116, and R117, which are connected in accordance with the schematic in FIG. 2 and have the resistance values there shown, determine the gains of the op-amps 1B, 1C, and 1D to be substantially in accord with Eq. (3).

The differential preamp stages are designed to provide gains of 24.7 and 50.9 through the op-amps 1D and 1C, respectively. The difference of voltages between the outputs of the op-amps 1D and 1C thereby provides a voltage gain of approximately 26.2 over the input signal from the thermocouple 10. This gain, as has been pointed out, is essentially thermally stabilized. One further amplification stage is then provided by feeding the differential inputs through respective resistors R118 and R119 to the op-amp 2B. The resistors R118 and R119 are chosen to have substantially equal values of resistance. The output of the op-amp 2B is fed back to its inverting terminal 2B-6 through a resistor R121, and the noninverting terminal is grounded through a resistor R120. The resistances of the resistors R119 and R121 are chosen to give a gain through the op-amp 2B substantially equal to 3. The output of the op-amp 2B will be proportional to the voltage difference between signals out of op-amps 1C and 1D, respectively, provided that the resistances of the resistors R118 and R119 are equal and the resistances of the resistors R121 and R120 are equal.

The choice of resistances is dictated in part by a requirement that currents in the circuit be kept very low. On the other hand, it is necessary that op-amp gains be kept in the essentially linear regions of op-amp performance in order for the circuit to function as designed. Linearity is essentially maintained by preventing the output from getting closer to the maximum supply voltage than about 1½ volts. In terms of the operation of the present circuit, the linearity requirements dictates a maximum gain of about 50, which is that provided by the op-amp 1C. The gain of the op-amp 1D is then dictated by the desired gain for the preamplifier stages, which is, in turn, dictated by the temperature-voltage characteristic of the thermocouple.

The additional gain provided by the op-amp 2B is for the purpose of minimizing the effect of inaccuracies in the gain compensator 22. The gain compensator 22 is for the purpose of changing the overall system gain at certain measured temperatures in accordance with the piecewise linear approximation. The system gain changes are in fact made by detecting the voltage output from the op-amp output 2B-7. Certain voltages will correspond to the temperatures at which gain changes are to be made. Variations in the response of the gain comparator 22 will cause small errors to occur in locating the precise voltage where a gain change is to be made. The effect of these errors in voltage upon the determination of the gain change temperature is reduced, however, by increasing the ratio of voltage change at the input to the gain compensator 22 to temperature change at the measuring junction 12 of the thermocouple. Such an increase is provided by the op-amp 2B.

Gain Compensator 22 and Attenuator 24

The gain compensator 22 has an overall gain designed to compensate for the nonlinear relationship between the thermocouple voltage output and the measured temperature T. The thermocouple response curve may be approximated by a series of straight lines, as already mentioned. The sequence of straight lines corresponds to different gains at different output levels. The voltage compensating network of the gain compensator 22 is comprised of a series of amplifying sections so arranged that each section becomes inactive when the input voltage reaches a predetermined level for that section.

Figure 3:
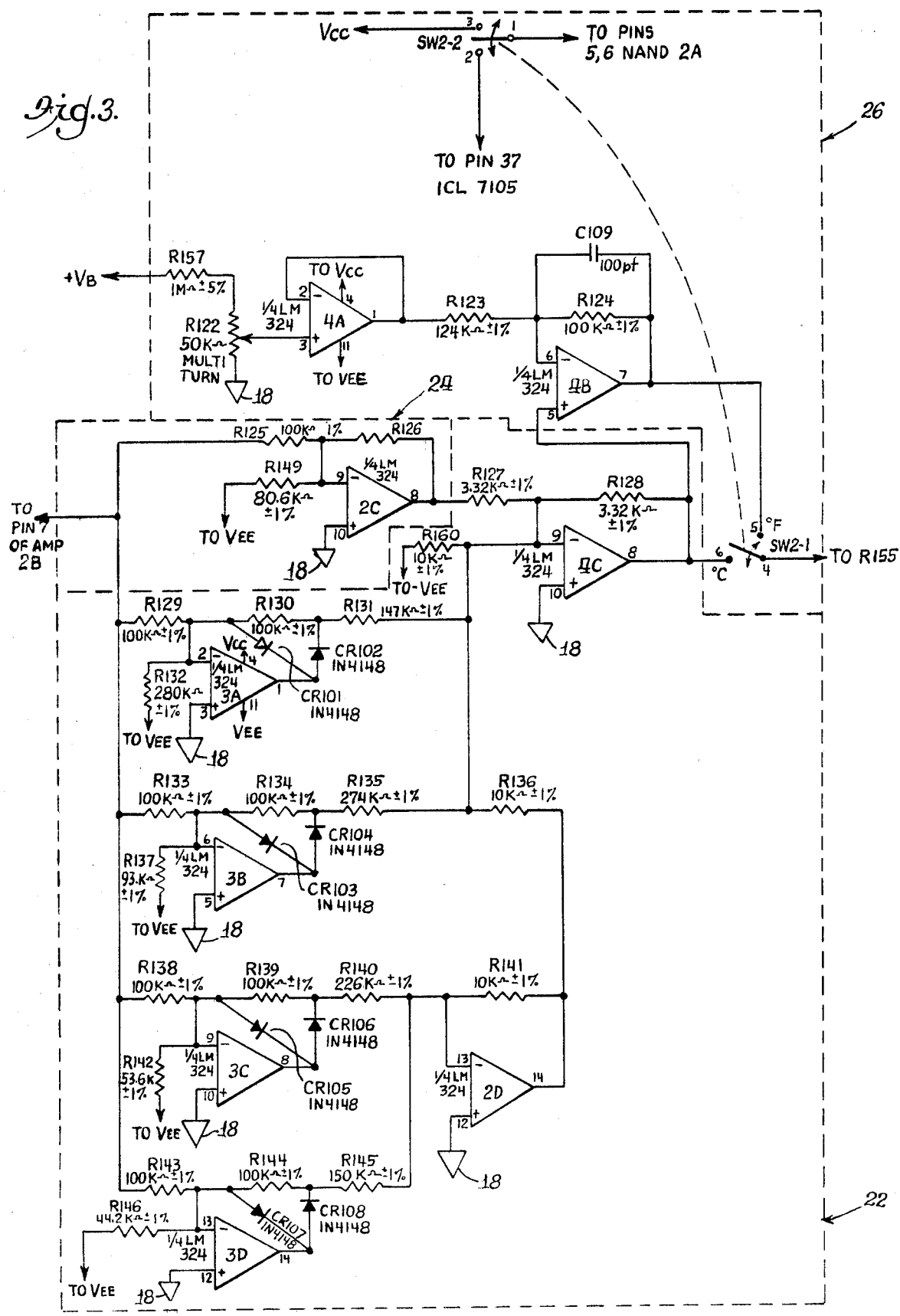
FIG. 3 is a schematic illustration of the gain compensation circuit and attenuator of the thermometer shown in FIG. 1.

Each section is arranged substantially in accordance with the circuit incorporating an op-amp 3A shown in FIG. 3. The noninverting terminal 3A-3 is grounded, and the inverting terminal 3A-2 is connected to the negative battery terminal $V_{EE}$ by a resistor R132. The output terminal 3A-1 is connected to the inverting terminal 3A-2 through a diode CR102 and a resistor R130 in series, in that order. The diode CR102 is forward biased when the output is positive with respect to the voltage applied to the inverting terminal 3A-2. The resistor R130 and diode CR102 are shunted by a second diode CR101 which becomes forward biased when the output is negative with respect to the inverting terminal 3A-2. The inverting terminal 3A-2 is connected to the input voltage through a resistor R129.

Persons skilled in the art of circuit analysis will understand that when the input voltage is sufficiently small, the diode CR102 will conduct, and the output voltage $V_{0A}$ will be substantially equal to $$V_{0A} = -[(R130/R132)V_{EE} + (R130/R129)e_{01}] \qquad (4)$$

where $V_{EE}$ is the voltage of the negative battery terminal, $-1.5$ volts in the specific embodiment, R130, R132 and R129 are the resistances of the respective resistors, and $e_{01}$ is the input voltage to the compensation stage from the terminal 2B-7. As $V_{0A}$ approaches ground potential, the diode CR101 becomes fully biased, and $V_{0A}$ becomes fixed substantially at ground potential. The condition for $V_{0A}$ to become fixed is that $$e_{01} \leq -(R129/R132)V_{EE} \tag{5}$$

The voltage where equality occurs is termed a "break-point."

The gain compensator 22 comprises four subcircuits, each substantially similar to the op-amp 3A circuit just described, to which the input voltage $e_{01}$ is applied in parallel. Each subcircuit is designed to provide a different gain over its active portion and a different break-point. An op-amp 2C is also in parallel with circuits which include the op-amps 3A, 3B, 3C and 3D except that the op-amp 2C circuit does not include the two diodes so that op-amp 2C amplifies over the entire range of input voltages.

The outputs of the op-amps 3C and 3D are picked off from the cathodes of diode CR106 and CR108, respectively, and fed through resistors R140 and R145, respectively, to the inverting terminal 2D-13 of an op-amp 2D. If the outputs of the op-amps 3D and 3C are, respectively, $e_d$ and $e_c$, then the output $V_{2D}$ of the op-amp 2D is $$V_{2D} = -R141[(e_d/R145)+(e_c/R140)] \tag{6}$$

where R141, R145 and R140 are the resistances of the respective resistors R141, R145 and R140, and where the resistor R141 connects the output terminal 2D-14 of the op-amp 2D to its inverting terminal 2D-13. It may therefore be seen that the op-amp 2D is used as an inverter.

The outputs are summed by feeding them into the inverting terminal 4C-9 of an op-amp 4C through resistors, as follows: from the op-amp 2C through a resistor R127, from the negative battery terminal $V_{EE}$ through a resistor R160, from the op-amp 3A (at the cathode of the diode CR102) through a resistor R131, from the op-amp 3B (from the cathode of a diode CR104) through the resistor R135, and from the op-amp 2D through a resistor R136. The output terminal 4C-8 of the op-amp 4C is connected to its inverting input terminal 4C-9 by a resistor R128, and its noninverting terminal 4C-10 input is grounded. The output of the op-amp 4C thereby provides a piecewise linear approximation to the response curve of the thermocouple 10. See Daniel H. Sheingold, Ed., NON-LINEAR CIRCUITS HANDBOOK (ANALOG DEVICES, Norwood, Mass. 1974), pages 94–97. The piecewise approximation in the present specific embodiment differs from that described in such reference in the use of the inverting op-amp 2D, thereby making it possible to fit both convex and concave curvature.

The relationship between output and input for the circuit will be given by the equation:

$$V_{4C} = e_{01}\{(R128/R127)(R126/R125)+(R128/R131)X_A+(R128/R135)X_B-(R128/R136)](R141/R140)X_C+(R141/R145)X_D]\}+V_{EE}\{[(R128/R127)(-R126/R149)-(R128/R160)]+(R128/R131)(R130/R132)X_A+(R128/R135)(R134/R137)X_B-(R128/R136)[(R139/R142)(R141/R140)X_C+(R141/R145)(R144/R146)X_D]\} \tag{7}$$

where RN is the resistance of the respective resistor and where $X_A$ is 1 below the break-point for the op-amp 3A and zero above the break-point. The quantities $X_B$, $X_C$ and $X_D$ are similarly defined for op-amps 3B, 3C, and 3D, respectively. In Eq. (7) the output voltage from op-amp 4C is $V_{4C}$, and the gains of op-amps 3A, 3B, 3C, and 3D are each made unity by the choice $$R129=R130=R133=R134=R138=R139=R143=R144 \tag{8}$$

The resistors in Eq. (7) are chosen to be 100 kilohms in order to minimize the current drain while providing unity gain for the op-amps.

The gain change in the output at the break-point where the op-amp 3A cuts out is calculated to be 1.78, as will be discussed. The overall signal gain in respect to this input to the op-amp 4C is 78.6, that is, the gain of the preamplifier 20. It follows that the ratio of R128:R131 times 78.6 should equal approximately 1.78. This ratio may be obtained with reasonably economical resistors if R131 is chosen to be approximately 147 kilohms and R128 is chosen to be 3.32 kilohms. The specific construction utilizes one percent resistors in the compensation circuit to obtain reasonable accuracy. Similar calculations result in component values as shown in order to obtain gain changes of 0.94 at the second break-point, 1.15 at the third break-point, and 1.71 at the fourth break-point.

The summing amplifier comprising the op-amp 4C is chosen to have unity gain in respect to the signal from the op-amp 2C. The resistance of the resistor R127 is therefore chosen to be equal to that of the resistor R128. The resistor R160 is used to give a small offset to the output of the op-amp 4C in order to provide for ease of zero adjusting the output display 30 at 0° C.

The op-amp 2C provides the only input to the op-amp 4C when the op-amps 3A, 3B, 3C, and 3D are no longer providing input to the op-amp 4C. That is, the output from the op-amp 2C must provide the correct temperature-voltage relationship at the high end of the temperature scale. It will be recalled that the differential output from the op-amps 1D and 1C was designed to provide that gain, and the op-amp 2B multiplied that gain by the factor of 3. Attenuation by a factor of 3 will then reduce the overall gain to make it substantially the desired gain of the circuit. The op-amp 2C therefore comprises the attenuator 24 to provide a gain which is just the inverse of the gain from the op-amp 2B, namely, a gain of $\frac{1}{3}$. Since the resistance of the resistor R125 is chosen to be 100 kilohms as a convenient value, the resistor 126 must therefore be a 33.2 kilohm resistor.

Further control of resistor tolerance may be obtained by utilizing resistors provided by the manufacturer in dual in-line packages. As a matter of practical experience, it has been noted that such a package of five percent resistors will have only two to three percent variations within the same package. It should be noted, however, that the circuit is designed to be very insensitive to small errors in the values of the resistances of the resistors in the gain compensator 22.

The op-amp 3D will be the only op-amp of the group 3A, 3B, 3C and 3D that will be providing output in the next to the highest temperature range. The op-amp 3D must provide a gain which is 1.71 less than the gain at the output of op-amp 2C. This result is obtained by having the op-amps 3D and 2D provide an incremental gain of 1.71, with the op-amp 2D inverting. The result is obtained by choosing the resistor R145 to have a resistance of 150 kilohms (which is the nearest one percent resistor to the requisite value of 153.2 kilohms) and the resistor R141 to have a resistance of 10 kilohms. The resistor R136 may conveniently be chosen to be a 10 kilohm resistor. Resistors R131, R135, and R140 are chosen in a manner similar to that for selecting the resistor R145 in order to provide the requisite sequence of truncated linear approximations to the thermocouple response curve. The output from the op-amp 4C will thereby provide substantially the desired result.

Celsius-Fahrenheit Converter 26

The specific construction of the Celsius-Fahrenheit converter 26 includes the op-amps 4A and 4B and associated circuitry, as shown in FIG. 3.

The output from the op-amp 4C is calibrated in degrees C. The output from the op-amp 4C is fed to the noninverting terminal 4B-5 of the op-amp 4B. The input to the inverting terminal 4B-6 is connected to the output terminal 4B-7 of the op-amp 4B by a resistor R124 which may be chosen to be 100 kilohms for purposes of economy and minimal current drain. The resistor R124 is by-passed by a capacitor C109 which serves a purpose analogous to that of the capacitor C107. A first pole SW2-1 of a double-pole switch SW2 determines whether the output of the op-amp 4C or the output of the op-amp 4B is connected to the display driver 28.

The inverting terminal 4B-6 of the op-amp 4B is connected to a bias voltage source through a resistor R123. The ratio of the resistances of resistors R124 and R123 is chosen to provide a gain at substantially 9/5, the ratio between temperature differences of 1° C. and 1° F. The resistor R123 is therefore chosen to have a resistance of 124 kilohms, for a one percent resistor.

The voltage bias is provided by the op-amp 4A, which has its noninverting terminal 4A-3 connected to a potentiometer R122 connected in series with a resistor R157 between the stable voltage $V_B$ and the stable ground 18. The inverting terminal 4A-2 of the op-amp 4A connects directly to its output terminal 4A-1, which in turn connects to the inverting terminal 4B-6 of the op-amp 4B through the resistor R123. The potentiometer R122 is used to set the 32 degrees zero displacement between the Fahrenheit and Celsius scales and is designed to be adjustable by the user. The output from the first pole SW2-1-1 of the switch SW2, whether it be Celsius or Fahrenheit, is fed to the display driver 28.

Display Driver 28, Display 30

Figure 4:
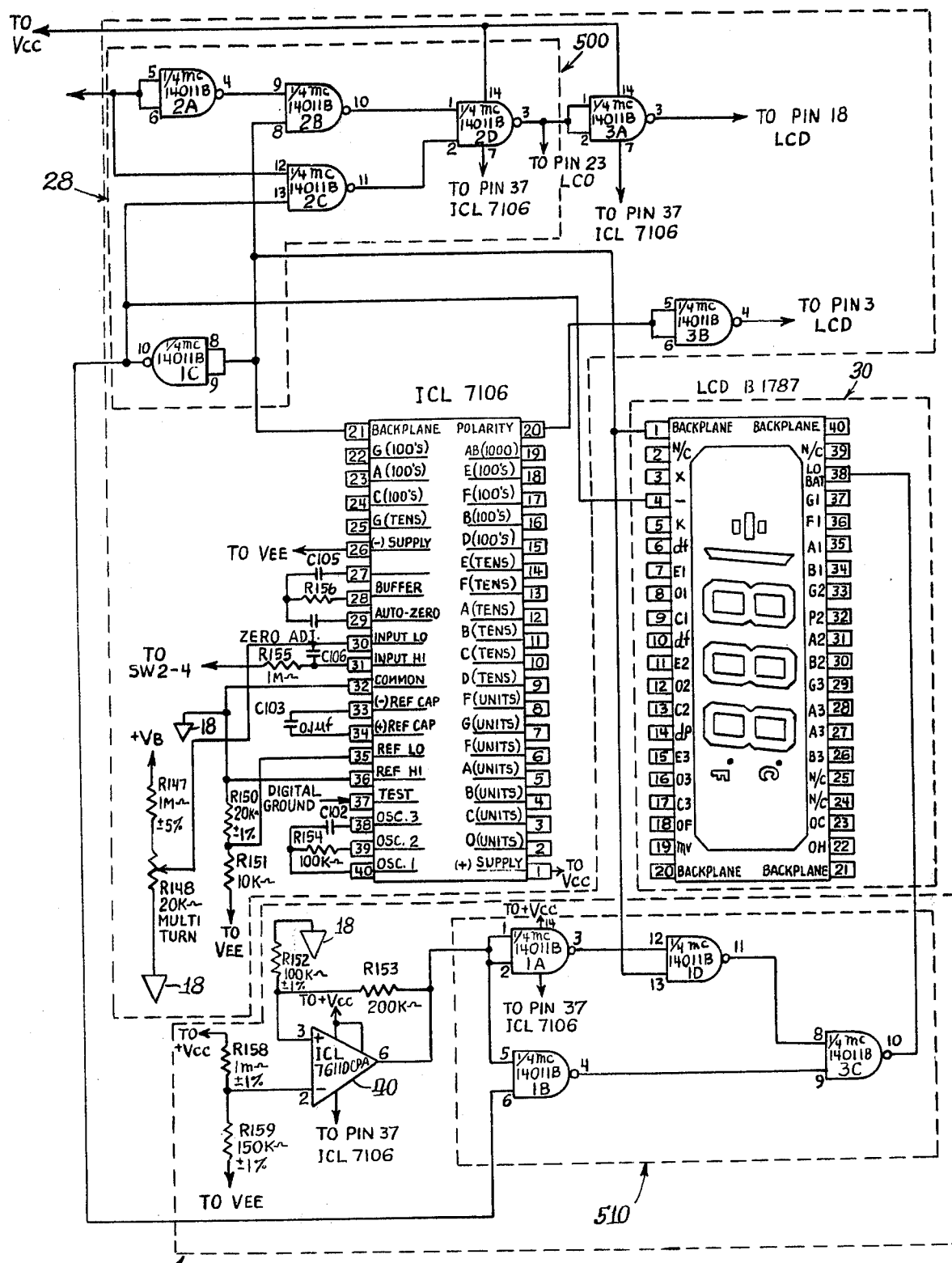
FIG. 4 is a schematic illustration of the display section and low battery indicator of the thermometer shown in FIG. 1.

The display driver 28 may comprise an Intersil integrated circuit ICL 7106 for controlling a display driver which may be an integrated LCD B-1787. As shown in FIGS. 3 and 4, the second pole SW2-2 of the switch SW2 connects either the positive battery terminal $V_{CC}$ or digital ground to one input of a logic circuit 500 that is equivalent to an exclusive OR-gate. The other input to the exclusive OR-gate 500 connects to the nominal 5 v. square wave backplane drive developed at pin 21 of the display driver 28 to drive the liquid crystal of the display 30 through pin 1 thereof. The output of the exclusive OR-gate 500 connects directly to a "C" indicator pin LCD B-1787-23 and through an inverter 3A to an "F" indicating pin LCD B-1787-18 in the display 30. The display will thereby exhibit an "F" or "C" according to whether the switch SW2 is in the Fahrenheit or Celsius position causing, respectively, the "F" or "C" input to be 180° out of phase with the square wave from the backplane drive ICL7106-21. The pole SW2-2 regulates the display indicator, whereas the pole SW2-1 determines whether or not the converter 26 is in the circuit.

A resistor R147 and a potentiometer R148 comprise a voltage divider between $V_B$ and ground for adjusting the 0° C. calibration of the display. It is not, of course, necessary to use 0° C. for calibration purposes; any other temperature could serve as well in a different embodiment.

FIG. 4 also shows a latching comparator 32 used as a low battery test circuit which is connected to the display 30. An op-amp 40 which may be an Intersil ICL 7611 DCPA op-amp is powered by connection between digital ground and the positive terminal of the battery which is at $V_{CC}$. The op-amp 40 is used in a Schmitt trigger circuit. The noninverting terminal 40-3 of the op-amp 40 connects to ground through a 100 kilohm resistor R152 and also connects to the output terminal 40-6 through a 200 kilohm resistor R153, thereby providing a 1 v. drop across the resistor R153 when the output of the op-amp 40 is at approximately $V_{EE}$. The inverting terminal 40-2 taps between the two battery terminals, being connected to the positive terminal $V_{CC}$ by a one megohm resistor R158 and to the negative terminal $V_{EE}$ by a 150 kilohm resistor R159. The output 40-6 of the op-amp 40 feeds one input of a second logic circuit 510 that is equivalent to an exclusive OR-gate for which the other input is the inverted square wave from the backplane drive ICL7106-21. The output of the op-amp 40 will provide a low input to the exclusive OR-gate 510 until the voltage at the inverting terminal falls below the voltage at the noninverting terminal, at which time the op-amp output voltage will go high. The high will be triggered when the battery voltage drops below about 7.7 v. if the resistors R158 and R159 have the resistance values shown in FIG. 4. Other resistances may be chosen to cause triggering at other voltages.

When the op-amp output 40-6 goes high, the output of the exclusive OR-gate 510 becomes 180° out of phase with the backplane drive. The output of the gate 510 is fed to the Lo Bat terminal 38 of the display 30 which thereby causes the "LO BAT" symbol to be displayed.

The display driver circuit ICL7106 and the display circuit LCDB-1787 may be wired as recommended by the Intersil Applications documentation supplied with the circuits.

Piecewise Linear Approximation

The design of the gain compensator 22 is based upon a piecewise linear approximation of the characteristics of the Omega type K nickel-chromium vs. nickel-aluminum reference tables as contained in the Omega Temperature Measurement Handbook, 1980, published by Omega Engineering Inc., Stamford, Conn. The voltage-temperature characteristic with the reference of 0° Celsius is approximated by a series of straight lines satisfying equations of the form $$T = T_0 + Gv \tag{9}$$

where $T_0$ is in degrees Celsius, G is the circuit gain for the range of temperatures approximated, and v is the thermocouple response in millivolts per degree Celsius. The quantity T on the left-hand side of the equation is therefore the approximation to the actual temperature resulting from the circuit output. Table 1 contains the values of $T_0$ and G for the indicated temperature ranges.

TABLE 1

| Temperature Range | $T_0$ °C. | G |
|---|---|---|
| −50 to +10 | 0 | 26.22 |
| +10 to +360 | 10.41 | 24.44 |
| +360 to +750 | 360.27 | 23.50 |
| +750 to +960 | 748.07 | 24.65 |
| +960 to +1100 | 957.32 | 26.36 |

The constants and the ranges were obtained from a graphical approximation to a graph of the thermocouple response curve. In another construction of a preferred embodiment, an analytic approximation could be obtained which minimizes the mean square error for a preselected number of segments.

Figure 5:
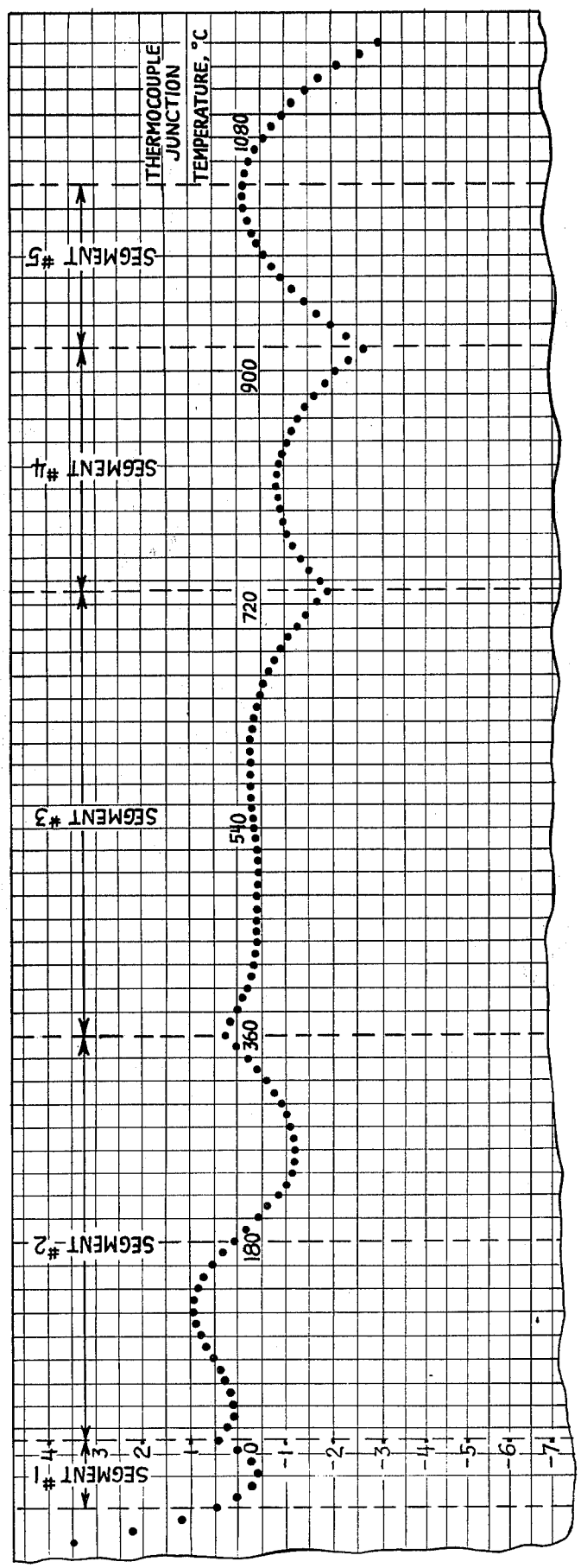
FIG. 5 is a graph showing the accuracy of the piecewise linear approximation of the thermocouple response curve as achieved by the circuit illustrated in FIG. 3.

FIG. 5 shows the difference between the thermocouple response curve and the truncated linear approximation to that curve as a function of temperature. The segments shown in FIG. 5, each having an extent indicated by a two-headed arrow, correspond to the temperature ranges tabulated in Table 1. The break-points are at the segment boundaries and correspond to the end points of each range.

The abscissa of the graph in FIG. 5 represents the Celsius temperature at the measuring junction of a Type K thermocouple when the reference junction is at 0° C. The Omega Handbook tabulates the resulting output voltage as a function of measuring junction temperature. The difference between the Handbook voltage and the output voltage predicted by the piecewise linear approximation at any given measuring temperature is represented by the ordinate in FIG. 5. The differences graphed in the figure do not include the additional small differences resulting from the fact that the circuit components do not provide precisely the gains and break-points required by the equations but, for reasons of economy, are slightly different.

It will, of course, be understood that modification of the present invention in its various aspects will be apparent to those skilled in the art, some being apparent only after study and others being a matter of routine design. For example, many other choices of resistance values and capacitance values would fall within the scope of the teachings of the present invention. Other choices of display means than liquid crystal displays are also contemplated by the present teachings. Possible temperature scales may be chosen to be other than Fahrenheit or Celsius; absolute scales, for instance, also may be used. Accordingly, the scope of the invention should not be limited by the particular embodiment and specific construction herein described, but should be defined only by the appended claims and equivalents thereof.

What is claimed is:

1. A hand-held thermometer comprising:
thermocouple means having a measuring junction and a reference junction for providing a millivolt range electrical signal systematically related to temperature according to a nonlinear response curve;
power supply means having a source of supply voltage and including a plurality of diodes on a single substrate for providing a substantially stable and temperature independent reference voltage difference, means for defining a stable ground, and means responsive to ambient temperature for generating a temperature dependent compensating voltage for compensating for variations in said millivolt range electrical signal occasioned by variations in the temperature of said reference junction;
means for combining said millivolt range electrical signal and said temperature dependent compensating voltage to produce a compensated electrical signal;
differential first amplification means including a plurality of integrated circuit amplifiers on a single substrate for providing a substantially temperature independent constant gain for amplifying said compensated electrical signal to produce a first amplified signal in the range of tenths of volts to volts;
second amplification means responsive to said first amplified signal and providing a gain that changes at preselected signal levels of said first amplified signal in order to provide a piecewise linear approximation to said nonlinear response curve whereby the output signal from said second amplification means is a second amplified signal substantially linearly related to the measured temperature of said measuring junction within preselected tolerances;
analog/digital conversion means responsive to said second amplified signal for providing digital signals representing the temperature at said measuring junction;
latching comparator means, comprising a Schmitt trigger and an exclusive OR-gate, responsive to said supply voltage and said reference voltage difference for detecting a low power supply voltage condition by producing a low voltage signal indicative thereof; and
display means responsive to said digital signals for indicating the measured temperature in digital form and responsive to said low voltage signal for indicating low voltage condition.

2. A hand-held thermometer comprising:
thermocouple means having a measuring junction and a reference junction for providing a millivolt range electrical signal systematically related to temperature according to a nonlinear response curve;
power supply means having a supply voltage and including a plurality of diodes on a single substrate for providing a substantially stable and temperature independent reference voltage difference, means for defining a stable ground, and means responsive to ambient temperature for generating a temperature dependent compensating voltage for compensating for variations in said millivolt range electrical signal occasioned by variations in the temperature of said reference junction;
means for combining said millivolt range electrical signal and said temperature dependent compensating voltage to produce a compensated electric signal;
differential first amplification means including a plurality of integrated circuit amplifiers on a single substrate for providing a substantially temperature independent constant gain for amplifying said compensated electrical signal to produce a first amplified signal in the range of tenths of volts to volts;
second amplification means responsive to said first amplified signal and providing a gain that changes at preselected signal levels of said first amplified signal in order to provide a piecewise linear approximation to said nonlinear response curve whereby the output signal from said second amplification means is a second amplified signal substantially linearly related to the measured temperature of said measuring junction within preselected tolerances;

scale selection means operable by a user for providing scale selection signals corresponding to the temperature scale selected by the user;

analog/digital conversion means responsive to the said amplified signal and said scale selection signals for providing digital signals representing the temperature at said measuring junction according to the temperature scale selected by the user;

latching comparator means, comprising a Schmitt trigger and an exclusive OR-gate, responsive to said supply voltage and said reference voltage difference for detecting a low power supply voltage condition by producing a low voltage signal indicative thereof; and display means responsive to said digital signals for indicating the measured temperature in digital form according to the temperature scale selected by the user and responsive to said low voltage signal for indicating low voltage condition.

3. A hand-held thermometer according to claim 2 wherein said scale selection means includes an exclusive OR-gate and an inverter.

4. In a hand-held thermometer comprising at least one battery that supplies voltage to a power supply means which generates a substantially stable and temperature independent reference voltage difference, the thermometer also comprising a display means, comprising an analog/digital display driver outputting a square wave that drives the backplane of a liquid crystal display having a low battery input terminal, capable of indicating a low battery condition, the improvement comprising a latching comparator which responds to the battery supplied voltage and the reference voltage difference to cause said display means to indicate a low battery condition when the battery voltage is less than a predetermined multiple of said reference voltage difference, said latching comparator being a Schmitt trigger which outputs into an exclusive OR-gate having the square wave as another input, causing the exclusive OR-gate to output an inverted square wave during a low battery condition, the inverted square wave being connected to the low battery input terminal of said liquid crystal display.

* * * * *

UNITED STATES PATENT AND TRADEMARK OFFICE
CERTIFICATE OF CORRECTION

PATENT NO. : 4,423,968
DATED : January 3, 1984
INVENTOR(S) : Nemcek et al.

It is certified that error appears in the above-identified patent and that said Letters Patent is hereby corrected as shown below:

Column 2, line 38:   "grain" should read --gain--.

Column 4, Line 43:   "protected" should read --protect--.

Column 5, Line 14:   "short" should read --sort--.

Column 6, Line 33:   "instrumentationquality" should read --instrumentation quality--.

Column 8, Line 23:   "comparator" should read --compensator--.

Signed and Sealed this

First Day of May 1984

[SEAL]

Attest:

GERALD J. MOSSINGHOFF

Attesting Officer    Commissioner of Patents and Trademarks